(12) United States Patent
Hsu et al.

(10) Patent No.: US 7,866,864 B2
(45) Date of Patent: Jan. 11, 2011

(54) MOTOR AND GUIDING STRUCTURE THEREOF

(75) Inventors: Chin-Chu Hsu, Taoyuan Hsien (TW); Chun-Hua Yang, Taoyuan Hsien (TW); Chia-Ying Hsu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 278 days.

(21) Appl. No.: 12/106,814

(22) Filed: Apr. 21, 2008

(65) Prior Publication Data

US 2009/0168444 A1  Jul. 2, 2009

(30) Foreign Application Priority Data

Dec. 26, 2007  (TW) .............................. 96150221 A

(51) Int. Cl.
*B60Q 1/04* (2006.01)

(52) U.S. Cl. ...................... 362/528; 362/527; 362/523; 362/512; 362/508; 310/49.01; 74/25

(58) Field of Classification Search ................ 362/528, 362/527, 523, 508, 512; 310/49.01; 74/25
See application file for complete search history.

(56) References Cited

U.S. PATENT DOCUMENTS

| | | | | |
|---|---|---|---|---|
| 6,257,747 B1 * | 7/2001 | Burton | ....................... | 362/524 |
| 6,918,691 B2 * | 7/2005 | Gattone et al. | .............. | 362/515 |
| 7,195,384 B2 * | 3/2007 | Chen | .......................... | 362/512 |
| 7,198,392 B2 * | 4/2007 | Hobbs et al. | ................. | 362/460 |
| 7,354,183 B2 * | 4/2008 | Burton | ....................... | 362/528 |
| 2003/0043591 A1 * | 3/2003 | Burton | ....................... | 362/528 |
| 2007/0041206 A1 * | 2/2007 | Aguinaga et al. | ........... | 362/524 |

\* cited by examiner

*Primary Examiner*—Quyen Leung
*Assistant Examiner*—Terrance Kenerly
(74) *Attorney, Agent, or Firm*—Muncy, Geissler, Olds & Lowe, PLLC

(57) ABSTRACT

A guiding structure includes a base and a guiding unit. The base has an opening, and an inner wall of the base, facing the opening, is formed with at least one first guiding element and at least one first restricting element disposed adjacent to the first guiding element. The guiding unit is inserted into the opening and has at least one second guiding element and at least one second restricting element. The second guiding element is correspondingly coupled to or separated from the first restricting element by deforming, bending, rotating or displacing. The first guiding element is disposed corresponding to the second guiding element.

18 Claims, 5 Drawing Sheets

MOTOR AND GUIDING STRUCTURE THEREOF

CROSS REFERENCE TO RELATED APPLICATIONS

This Non-provisional application claims priority under 35 U.S.C. §119(a) on Patent Application No(s). 096150221, filed in Taiwan, Republic of China on Dec. 26, 2007, the entire contents of which are hereby incorporated by reference.

BACKGROUND OF THE INVENTION

1. Field of Invention

The present invention relates to a motor and a guiding structure thereof.

2. Related Art

The headlight for vehicles is usually cooperated with a motor and a guiding structure for adjusting the lighting angle of the headlight. In details, the guiding structure can convert the rotation of the motor into an axial force so as to provide the linear actions on the headlight, such as forward or backward. Thus, the headlight can be pushed to generate lights with different angles.

The conventional guiding structure has a base and the guiding rod. The base has a plurality of elastic sheets, and the inner side of each elastic sheet has a guiding groove. Several guiding ribs are disposed protruding from the edge of the guiding rod. The guiding rod is capable of sliding in the groove, and the elastic sheet can restrict the movement range of the guiding rod.

However, forming the elastic sheet and guiding groove on the side wall of the central opening of the base requires very precise processing technology, and thus the manufacturing cost and time for forming the conventional guiding structure are high.

In addition, since the elastic sheet is formed inside the small central opening of the base, the limitation of the size of the central opening and a certain distance must be provided between the elastic sheet and the side wall of the central opening, the width and thickness of the elastic sheet must be very thin. Therefore, the elastic sheet may be broken or damaged during the movement of the guiding structure, thereby affecting the reliability of the product and causing the trouble of the user. Moreover, the difficulties of manufacturing the mold and processing steps may also be increased, so that the manufacturing cost is increased, too.

Furthermore, the elastic sheet guides the guiding rod by deforming, so that the guiding rod may be unstable during its movement.

SUMMARY OF THE INVENTION

In view of the foregoing, the present invention is to provide a motor and a guiding structure thereof that have cheaper manufacturing cost and are stronger and more stable.

To achieve the above, the present invention discloses a guiding structure including a base and a guiding unit. The base has an opening, and an inner wall of the base, facing the opening, is formed with at least one first guiding element and at least one first restricting element. The first restricting element is disposed adjacent to the first guiding element. The guiding unit is inserted into the opening and has at least one second guiding element and at least one second restricting element. The second guiding element is correspondingly coupled to or separated from the first restricting element by deforming, bending, rotating or displacing. The first guiding element is corresponding to the second guiding element.

In addition, the present invention also discloses a motor including a motor body and a guiding structure. The guiding structure includes a base and a guiding unit connecting to the motor. The base has an opening, and an inner wall of the base, facing the opening, is formed with at least one first guiding element and at least one first restricting element. The first restricting element is disposed adjacent to the first guiding element. The guiding unit is inserted into the opening and has at least one second guiding element and at least one second restricting element. The second guiding element is correspondingly coupled to or separated from the first restricting element by deforming, bending, rotating or displacing. The first guiding element is corresponding to the second guiding element.

As mentioned above, the present invention can utilize the firmed guiding members to restrict the position of the guiding unit, so that the vibration of the moving guiding unit can be sufficiently decreased. In addition, since the guiding and restricting of the guiding structure are independently functioned, the product reliability and alignment accuracy can be greatly increased. The restricting element can restrict the guiding unit by deforming, bending, rotating or displacing, so that the manufacturing processes of the guiding structure can be simplified and the manufacturing time of the guiding structure can be reduced. Moreover, the size of the restricting element can be properly enlarged so as to improve the strength of the restricting element.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
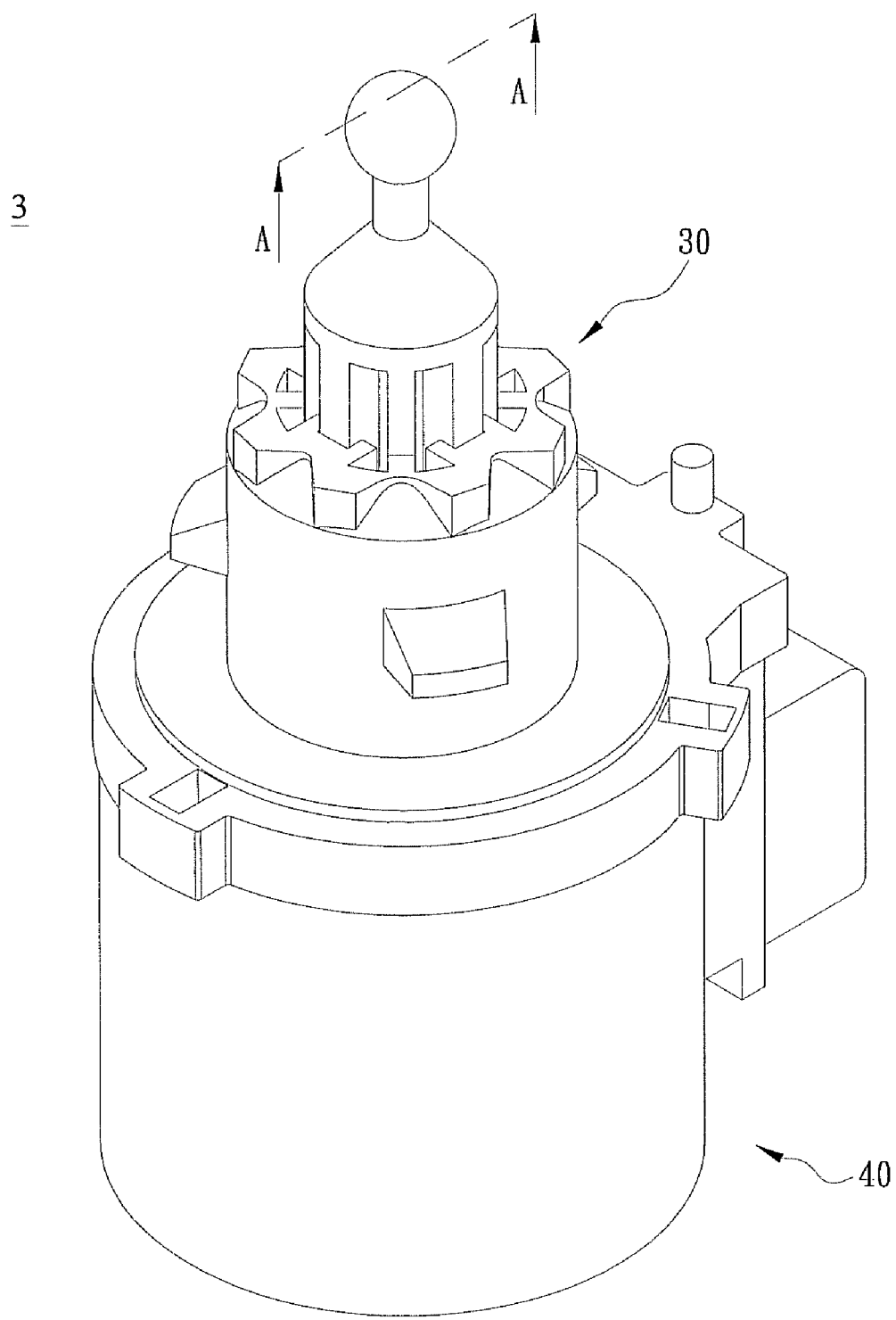
FIG. 1 is a schematic illustration showing a motor according to an embodiment of the present invention.
Figure 2:
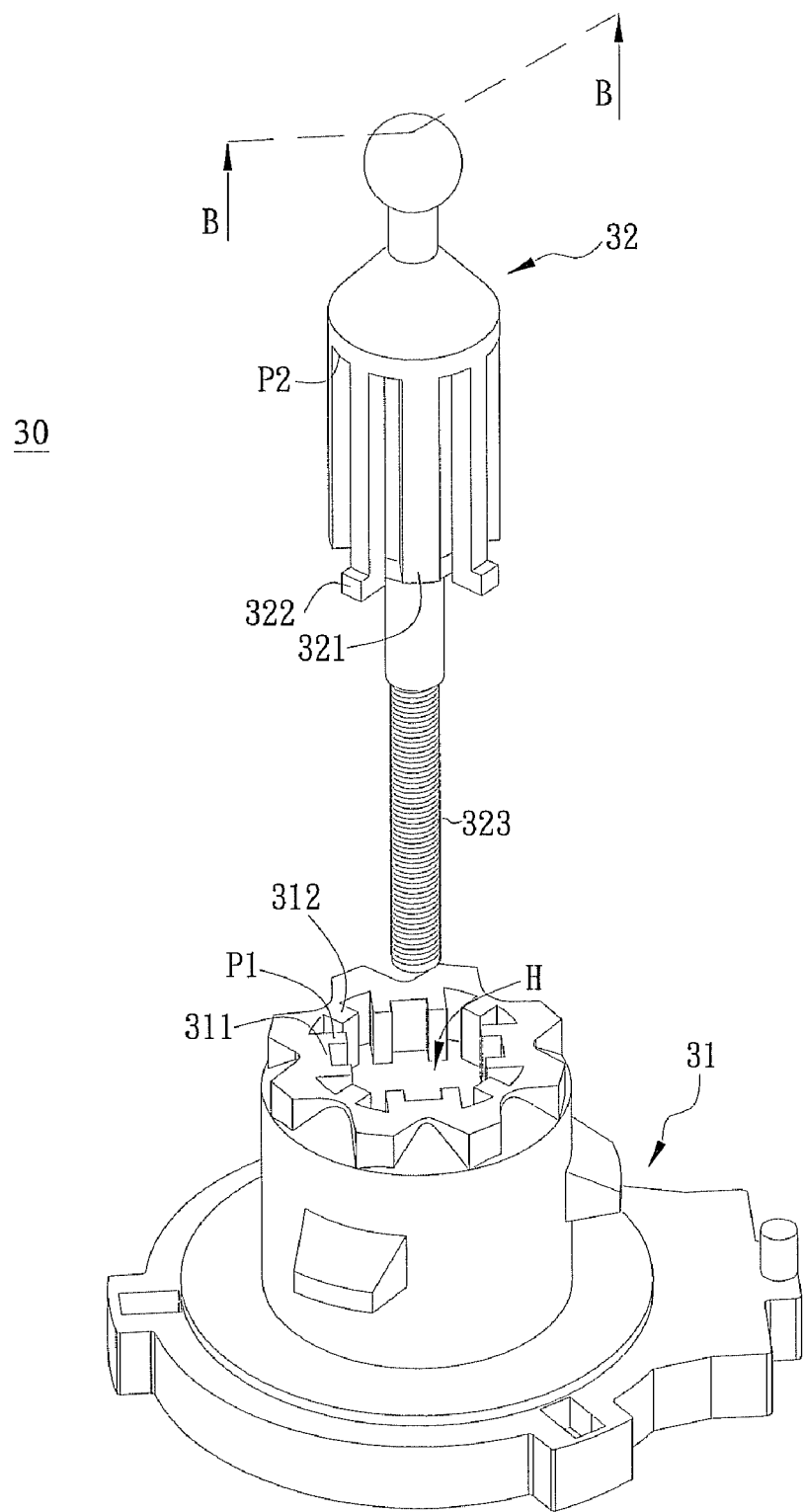
FIG. 2 is an exploded diagram of the guiding structure of the motor in FIG. 1.

FIG. 1 is a schematic illustration showing a motor and a guiding structure according to an embodiment of the present invention. FIG. 2 is an exploded diagram of the guiding structure of the motor in FIG. 1. With reference to FIGS. 1 and 2, a motor 3 according to the embodiment of the present invention includes a motor body 40 and a guiding structure 30. In the embodiment, the motor 3 can be, for example but not limited to, a stepping motor for a headlight of a vehicle.

The guiding structure 30 is disposed on the motor body 40 and includes a base 31 and a guiding unit 32. The base 31 has an opening H, and the inner wall of the base 31, facing the opening H, is formed with at least one first guiding element 311 and at least one first restricting element 312, which is disposed adjacent to the first guiding element 311. The first guiding element 311, the first restricting element 312 and the base 31 can be integrally formed as a single unit. In the embodiment, there are several first guiding elements 311 and several first restricting elements 312, the first guiding elements 311 are alternately formed on the inner wall of the base 31, and the first restricting elements 312 are alternately disposed around the opening H.

The guiding unit 32 is inserted into the opening H and the guiding unit 32 has at least one second guiding element 321 and at least one second restricting element 322, which is disposed adjacent to the second guiding element 321. The second guiding element 321, the second restricting element 322 and the guiding unit 32 can be integrally formed as a single unit. In the embodiment, the guiding unit 32 has a plurality of second guiding elements 321 and second restricting elements 322. The second guiding elements 321 are disposed corresponding to the first guiding elements 311, respectively. The second restricting elements 322 are disposed corresponding to the first restricting elements 312, respectively. The second restricting elements 322 can be coupled to or separated from the first restricting elements 312 by deforming, bending, rotating or displacing.

As mentioned above, the corresponding first guiding element 311 and second guiding element 321 can be a set of a groove and a rib, a set of a protrusion and a recess, or a set of a sliding protrusion and a sliding rail. In the embodiment, the corresponding first guiding element 311 and second guiding element 321 are a set of a groove and a rib, for example, i.e. if the first guiding element 311 is a groove, the second guiding element 321 is a rib; otherwise, if the first guiding element 311 is a rib, the second guiding element 321 is a groove. In addition, the second restricting element 322 can further has a protrusion portion for limiting a moving distance of the guiding unit 32.

Figure 3:
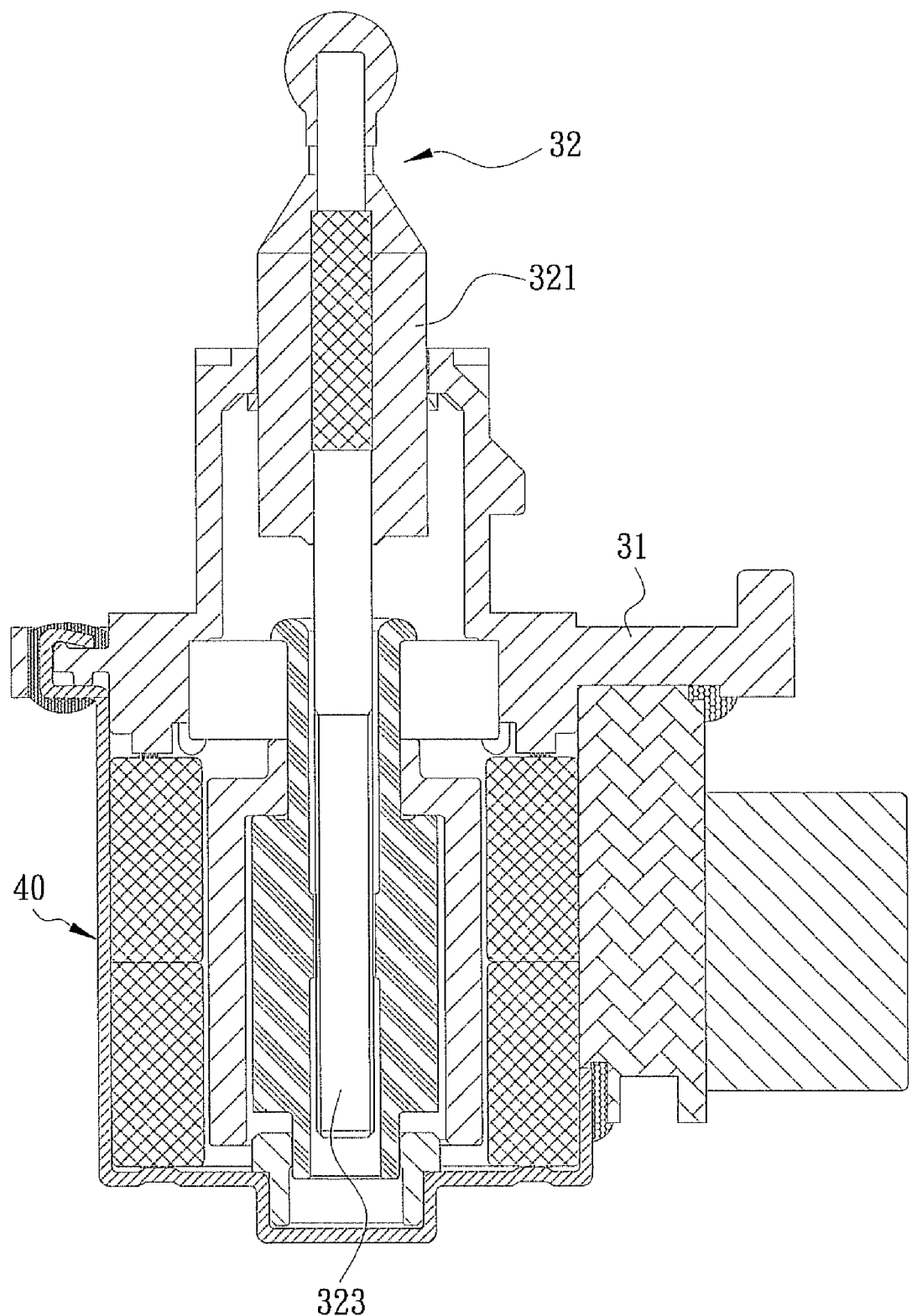
FIG. 3 is a sectional illustration of the motor along the line A-A of FIG. 1.

FIG. 3 is a sectional illustration of the motor along the line A-A of FIG. 1. Referring to FIGS. 2 and 3, the guiding unit 32 further includes a connecting element 323 for connecting the guiding unit 32 to the motor body 40 or a rotor of the motor 3. In the embodiment, the second guiding element 321 and the second restricting element 322 are disposed around the connecting element 323.

Figure 4A:
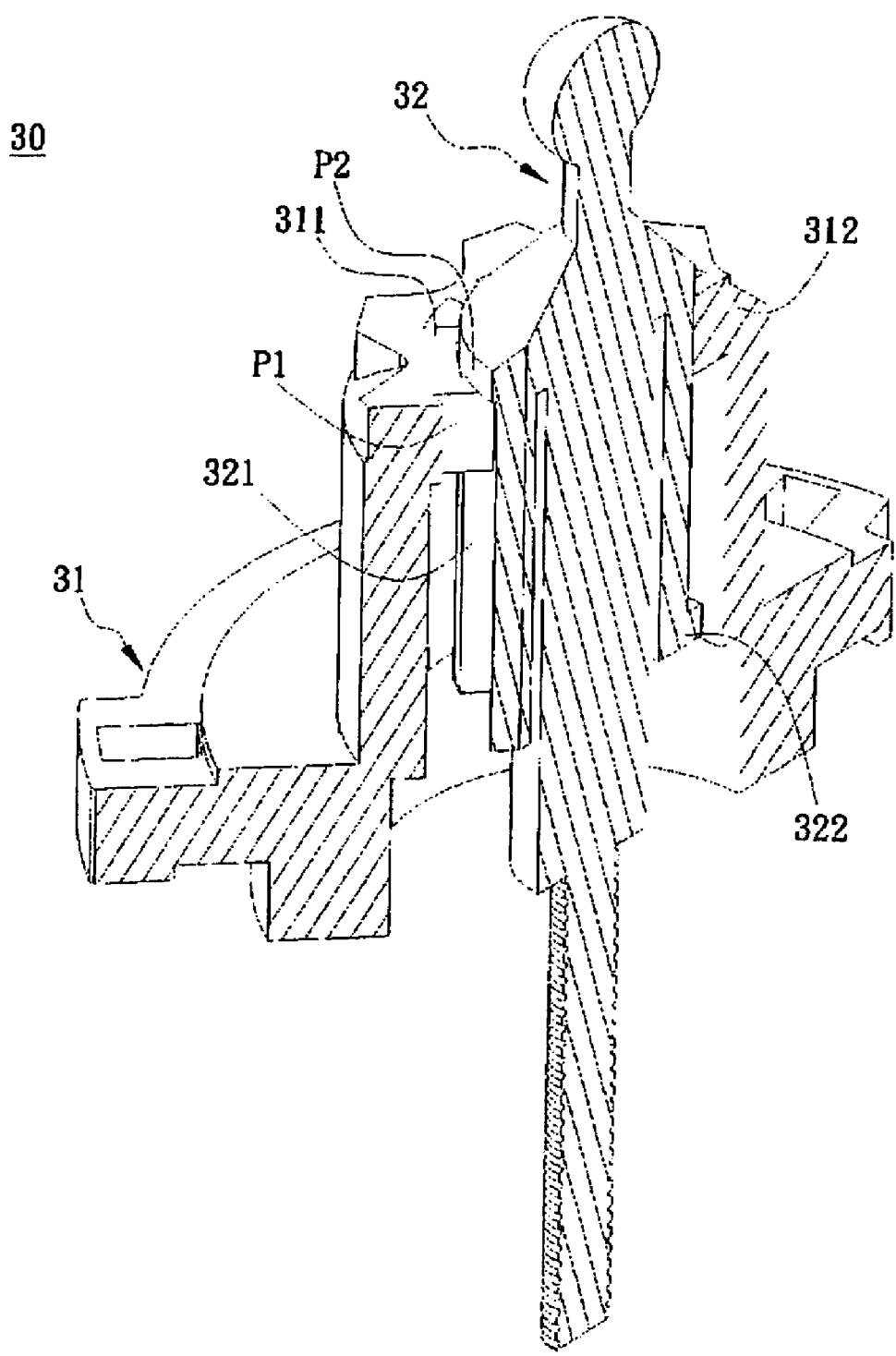
FIGS. 4A and 4B are sectional illustrations of the guiding structure along the line B-B of FIG. 2.
Figure 4B:
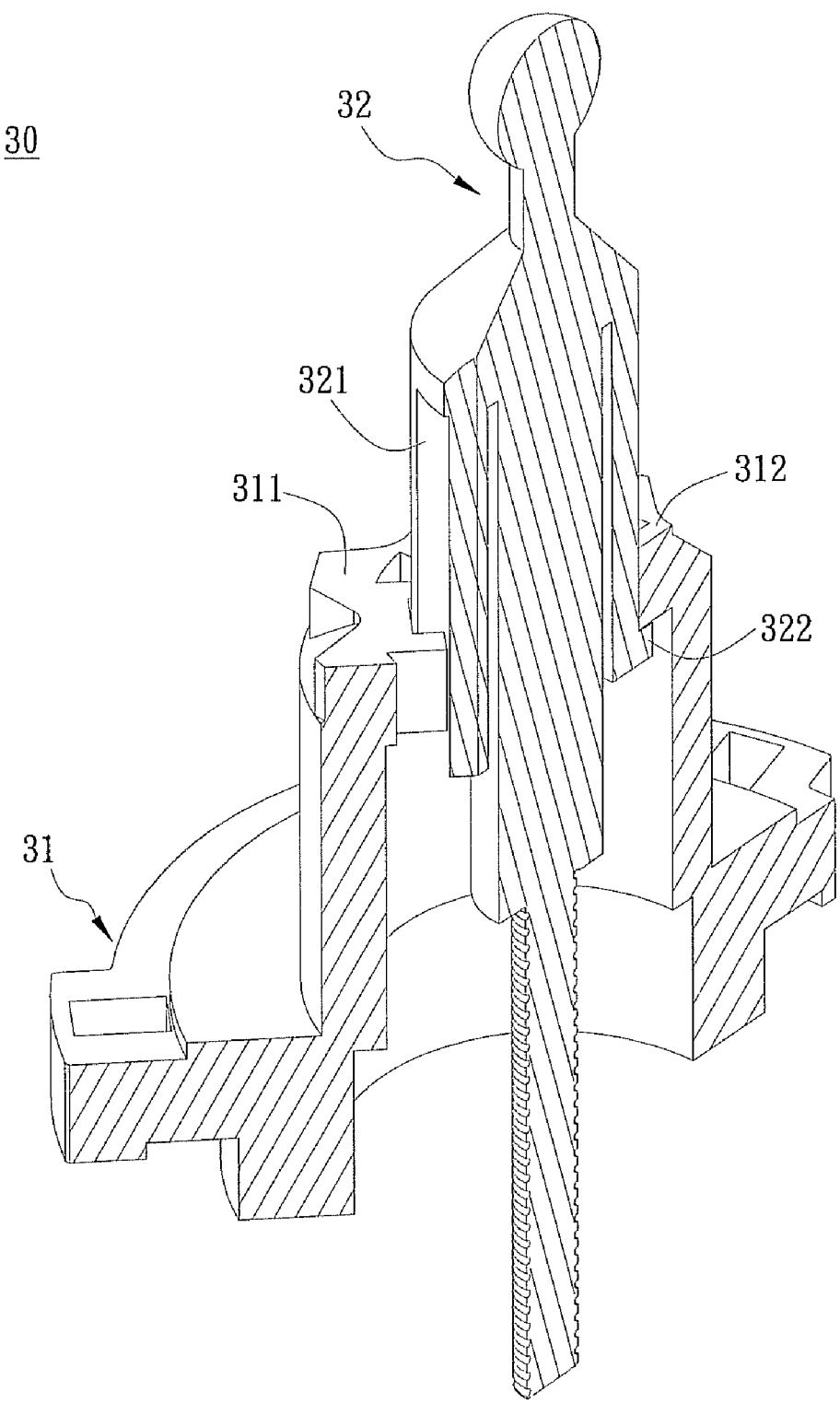

FIGS. 4A and 4B are sectional illustrations of the guiding structure 30 along the line B-B of FIG. 2. To make the present invention more comprehensive, the actions of the guiding structure 30 will be described hereinafter. Although the detailed description of the motor body is omitted, it should be noted that the actual operation of the guiding structure 30 must be applied with the motor body 40.

With reference to FIGS. 2, 4A and 4B, the first guiding element 311 is a concave groove, and the second guiding element 321 is a convex rib. The first guiding element 311 has a first blocking portion P1 and the second guiding element 321 has a second blocking portion P2 for restricting a position of the guiding unit 32. In this embodiment, the guiding element 311 has two blocking portions P1 respectively located between each concave groove so that the radial movement of each second guiding element 321 can is limited, and each second guiding element 321 is only sliding up and down within the first guiding element 311.

As shown in FIG. 4A, when the guiding unit 32 moves downwardly, the second blocking portion P2 of each second guiding element 321 will lean and press against the first blocking portion P1 of the first guiding element 311 correspondingly. Thus, the guiding unit 32 can be stopped at a first position (the lowest position). This is an example of the position limitation when the guiding unit 32 moves downwardly.

On the other hand, as shown in FIG. 4B, when the guiding unit 32 moves upwardly, the protrusion structure of each second restricting element 322 will lean and press against the first restricting element 312 of the base 31 correspondingly. Thus, the guiding unit 32 can be stopped at a second position (the highest position). This is an example of the position limitation when the guiding unit 32 moves upwardly.

Therefore, the guiding unit 32 can move up and down with respective to the base 31 between the first and second positions by utilizing the first guiding elements 311, the first restricting elements 312, the second guiding elements 321 and the second restricting elements 322.

In summary, the present invention can utilize the firmed guiding members to restrict the position of the guiding unit, so that the vibration of the moving guiding unit can be sufficiently decreased. In addition, since the guiding and restricting of the guiding structure are independently functioned, the product reliability and alignment accuracy can be greatly increased. The restricting element can restrict the guiding unit by deforming, bending, rotating or displacing, so that the manufacturing processes of the guiding structure can be simplified and the manufacturing time of the guiding structure can be reduced. Moreover, the size of the restricting element can be properly enlarged so as to improve the strength of the restricting element.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A guiding structure, comprising:
   a base, comprising an opening, wherein an inner wall of the base, facing the opening, is formed with at least one first guiding element and at least one first restricting element, and the first restricting element is disposed adjacent to the first guiding element; and
   a guiding unit inserted into the opening and having at least one second guiding element and at least one second restricting element, wherein the second guiding element is correspondingly coupled to or separated from the first restricting element, and the first guiding element is corresponding to the second guiding element,
   wherein the first guiding element has a first blocking portion and the second guiding element has a second blocking portion for restricting a position of the guiding unit.

2. The guiding structure according to claim 1, wherein the first guiding element and the second guiding element are a set of a groove and a rib, a set of a protrusion and a recess, or a set of a sliding protrusion and a sliding rail.

3. The guiding structure according to claim 2, wherein the first guiding element is a concave groove, and the second guiding element is a convex rib, and vise versa.

4. The guiding structure according to claim 1, wherein the second restricting element has a protrusion portion for limiting a moving distance of the guiding unit.

5. The guiding structure according to claim 1, wherein the first guiding element, the first restricting element and the base are integrally formed as a single unit.

6. The guiding structure according to claim 1, wherein the second guiding element, the second restricting element and the guiding unit are integrally formed as a single unit.

7. The guiding structure according to claim 1, wherein the guiding unit further comprises a connecting element for connecting to a motor.

8. The guiding structure according to claim 1, wherein the second restricting element is correspondingly coupled to or separated from the first restricting element by deforming, bending, rotating or displacing.

9. A motor, comprising:
   a motor body; and
   a guiding structure, disposed on the motor body comprising:
   a base, comprising an opening, wherein an inner wall of the base, facing the opening, is formed with at least one first guiding element and at least one first restricting element, and the first restricting element is disposed adjacent to the first guiding element, and
   a guiding unit inserted into the opening and connecting to the motor body, wherein the guiding unit has at least one second guiding element and at least one second restricting element, the second guiding element is correspondingly coupled to or separated from the first restricting element, and the first guiding element is corresponding to the second guiding element,
   wherein the first guiding element has a first blocking portion and the second guiding element has a second blocking portion for restricting a position of the guiding unit.

10. The motor according to claim 9, wherein the first guiding element and the second guiding element are a set of a groove and a rib, a set of a protrusion and a recess, or a set of a sliding protrusion and a sliding rail.

11. The motor according to claim 10, wherein the first guiding element is a concave groove, and the second guiding element is a convex rib, and vise versa.

12. The motor according to claim 9, wherein the second restricting element has a protrusion portion for limiting a moving distance of the guiding unit.

13. The motor according to claim 9, wherein the first guiding element, the first restricting element and the base are integrally formed as a single unit.

14. The motor according to claim 9, wherein the second guiding element, the second restricting element and the guiding unit are integrally formed as a single unit.

15. The motor according to claim 9, wherein the guiding unit further comprises a connecting element for connecting to the motor body.

16. The motor according to claim 9, wherein the second restricting element is correspondingly coupled to or separated from the first restricting element by deforming, bending, rotating or displacing.

17. The motor according to claim 9, wherein the base comprises a plurality of first guiding elements and a plurality of first restricting elements, the first guiding elements are alternately formed on the inner wall of the base, and the first restricting elements are alternately disposed around the opening.

18. The motor according to claim 9, wherein the motor is a stepping motor for a headlight of a vehicle.

* * * * *